(12) United States Patent
Chan et al.

(10) Patent No.: US 9,378,054 B2
(45) Date of Patent: Jun. 28, 2016

(54) TESTING SYSTEM WITH METHODOLOGY FOR BACKGROUND APPLICATION CONTROL

(71) Applicant: Dropbox, Inc., San Francisco, CA (US)

(72) Inventors: Richard Chan, San Francisco, CA (US); Stephen Poletto, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 231 days.

(21) Appl. No.: 13/927,279

(22) Filed: Jun. 26, 2013

(65) Prior Publication Data

US 2014/0310724 A1  Oct. 16, 2014

Related U.S. Application Data

(60) Provisional application No. 61/811,641, filed on Apr. 12, 2013.

(51) Int. Cl.
*G06F 9/46* (2006.01)
*G06F 9/48* (2006.01)
*G06F 11/36* (2006.01)

(52) U.S. Cl.
CPC .......... *G06F 9/4843* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 5,453,992 A * | 9/1995 | Whetsel | 714/730 |
| 6,687,735 B1 * | 2/2004 | Logston et al. | 709/203 |
| 8,347,314 B2 | 1/2013 | Baek et al. | |
| 2002/0078449 A1 * | 6/2002 | Gordon et al. | 725/41 |
| 2004/0015316 A1 * | 1/2004 | Sarfati et al. | 702/122 |
| 2004/0189712 A1 * | 9/2004 | Rundell | 345/808 |
| 2006/0085681 A1 * | 4/2006 | Feldstein et al. | 714/25 |
| 2007/0288963 A1 * | 12/2007 | Ahmad-Taylor et al. | 725/46 |
| 2008/0118086 A1 * | 5/2008 | Krig | 381/104 |
| 2008/0189708 A1 * | 8/2008 | Cheng et al. | 718/102 |
| 2012/0063345 A1 * | 3/2012 | Krzanowski et al. | 370/252 |
| 2012/0258722 A1 | 10/2012 | Liu | |
| 2013/0024812 A1 * | 1/2013 | Reeves et al. | 715/810 |
| 2013/0067475 A1 | 3/2013 | Singh et al. | |
| 2013/0067495 A1 * | 3/2013 | Singh et al. | 719/318 |

* cited by examiner

*Primary Examiner* — Shih-Wei Kraft
(74) *Attorney, Agent, or Firm* — Hickman Palermo Becker Bingham LLP

(57) ABSTRACT

A testing system with methodology for background application control is described. In one embodiment, for example, a method for controlling a background application is provided that includes steps of: prior to or after a test application enters a background execution state, the test application sending a first message to a reflector application via an interprocess communication facility provided by an operating system executing the test application and the reflector application; in response to the reflector application receiving the first message, the reflector application sending a second message to the first application via the interprocess communication facility; wherein sending the second message causes the operating system to transition the test application from the background execution state to a foreground execution state.

16 Claims, 4 Drawing Sheets

TESTING SYSTEM WITH METHODOLOGY FOR BACKGROUND APPLICATION CONTROL

PRIORITY CLAIM

This application claims the benefit of Provisional Appln. 61/811,641, entitled "Testing System with Methodology for Background Application Control", and filed Apr. 12, 2013, the entire contents of which is hereby incorporated by reference as if fully set forth herein, under 35 U.S.C. §119(e).

TECHNICAL FIELD

The present invention relates generally to systems and methods for testing software applications and, more particularly, to a testing system with methodology for background application control.

BACKGROUND

The first computers were largely stationary units that operated on fixed power. Early multitasking solutions focused mainly on maximizing CPU utilization and computing task throughput. Over time, computers became interactive. For example, time-sharing computers were developed that allowed multiple users to interact with the same computer at the same time with the perception to each user that he or she was the only one using the computer.

Today, many computers are preemptive multitasking systems. In many preemptive multitasking systems, an operating system determines when and for how long each of multiple applications execute. Developing applications for most preemptive multitasking systems is a relatively simple in the respect that such applications do not need to be programmed to voluntarily cede CPU time to allow other applications to execute. Instead, the operating system interrupts executing applications as and when efficient or convenient to do so to allow other applications to have CPU time.

At the same time, as more and more portable computing devices operate on battery power and with relatively limited computing resources (e.g., memory), some operating systems on portable computing devices perform a form of preemptive multitasking of applications to limit computer memory usage, conserve battery power, and increase the time between battery charges. In particular, some operating systems allow only one application or only a small number of applications to actively execute in the "foreground" at a time. In many cases, these operating systems allow only the foreground applications to receive and respond to certain user interface events. These operating systems may place a current foreground application into the "background" to allow other applications to execute as a foreground application. To limit computer memory usage and conserve battery power, these operating systems may allow a background application to perform only limited computation or not perform any computation at all. Further, these operating systems may not allow or may provide only limited ability for a background application to programmatically foreground itself when in a background state. Instead, a background application is forced to rely on the operating system to bring it into the foreground at the appropriate time, for example, in response to user input detected by the operating system.

To limit computer memory usage and conserve battery power, an operating system on a battery-operated portable computing device will often maintain an executing application in one of a set of possible application execution states. A typical set of application execution states is shown in FIG. 1, wherein the application execution state diagram 110 includes a "not running" state 112, a "foreground" state 114, and a "background" state 116. In the not running state 112, the application has not been launched or was executing but has since been terminated by the operating system. When an application is launched, the operating system transitions the application from the not running state 112 to the foreground state 114. In the foreground state 114, the application is executing in the foreground and typically can receive and respond to certain user input events such as, for example, touch screen input events. Various system events can cause the operating system to transition an application from the foreground state 114 to the background state 116. For example, the operating system may transition an application currently in the foreground state 114 to the background state 116 when a user presses a "home" button of the device or when another application is launched. As mentioned above, the operating system may prevent an application in the background state 116 from executing any tasks or may allow the application to perform only certain limited "background" tasks such as, for example, playing audible content, downloading a file from a network service, or communicating with an external accessory (e.g., a Bluetooth peripheral). The operating system may transition the application from the background state 116 back to the foreground state 114 in response to detecting certain system events such as, for example, a user re-launching the application. In some situations, the operating system may transition an application in the background state 116 to the not running state 112. For example, the operating system may transition an application in the background state 116 to the not running state 112 to free computing resources (e.g., memory) for use by current foreground applications or if the application has been in the background state 116 for longer than a predetermined amount of time.

Overall, by design, operating systems on some types of portable battery-operated computing devices largely, if not exclusively, control when an application transitions from the background state 114 to the foreground state 112. This lack of control by background applications to trigger the transition on their own presents a challenge to a developer of an application for such an operating system. In particular, the developer may wish to automate the testing of certain application features that are invoked when the application transitions from the background state 114 to the foreground state 112. Since there is typically no programmatic way within an application to by itself force such an operating system to transition the application from the background state 114 to the foreground state 112, the transition cannot be automated from within the application. In some cases, the transition may be triggered manually by a user. However, such manual triggering is a less than ideal solution where automation is preferred.

A testing solution is desired that controls background applications to provide automated testing. The solution should not only address the problem of automating the transition of an application from a background state to the foreground state, but should also provide a solution to the more general problem of controlling application state transitions for automated testing purposes. The present invention provides a solution for these and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF SOME EMBODIMENTS

A testing system with methodology for background application control is described. In one embodiment, for example, a method for controlling a background application is provided that includes steps of: prior to a first application entering a background execution state, the first application sending a first message to a second application via an interprocess communication facility provided by an operating system executing the first application and the second application; wherein after sending the first message, the first application enters the background execution state; in response to the second application receiving the first message, the second application sending a second message to the first application via the interprocess communication facility; wherein sending the second message causes the operating system to transition the first application from the background execution state to a foreground execution state.

In another embodiment, for example, a method for controlling a background application is provided that includes the steps of: after a first application enters a background execution state, the first application sending a first message to a second application via an interprocess communication facility provided by an operating system executing the first application and the second application; in response to the second application receiving the first message, the second application sending a second message to the first application via the interprocess communication facility; wherein sending the second message causes the operating system to transition the first application from the background execution state to a foreground execution state.

DETAILED DESCRIPTION

Glossary

Figure 1:
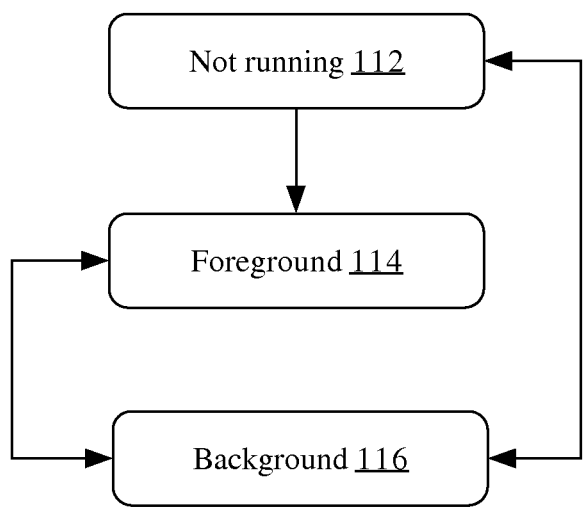
FIG. 1 a block diagram representing typical application execution states and transitions therebetween of some operating systems for battery-operated portable computing devices.

The following definitions are provided for purposes of illustration, not limitation, in order to assist with understanding the discussion that follows.

Application: A computer program or set of computer-executable instructions that provides particular functionality or performs specific tasks. An application typically executes as a process or task on an operating system.

Process: A process or task refers to the combination of a program (e.g., an application program) being executed on an operating system and associated bookkeeping information used by the operating system (e.g., executed state information). When a program is executed, the operating system typically creates a new process for each instance of the program being executed. The process is like an envelope for the program which identifies the program with a process number (e.g., a process identifier or "ID") and associates other bookkeeping information to the process. Many operating systems, including APPLE IOS and ANDROID, are capable of running many processes (or tasks) at the same time and are called multi-tasking operating systems.

URL: URL is an abbreviation of Uniform Resource Locator, a character string with a specific syntax for addressing and accessing a resource on a network. The first part of the character string indicates what network protocol to use to access the resource (e.g., "http" or https"), followed by a colon and two forward slashes. The second part of the string specifies an IP address or a domain name where the resource is located on the network. The optional third part of the string indicates a location-specific path to the resource. The third part may also contain application-specific data (e.g., a query string) and subordinate resource identifying information (e.g., a fragment identifier).

Introduction

Referring to the figures, exemplary embodiments of the invention will now be described. The following description will focus on the presently preferred embodiment of the present invention, which is implemented in desktop and/or server software (e.g., driver, application, or the like) running under an operating system, such as the APPLE IOS operating system. The present invention, however, is not limited to any one particular application or any particular environment. Instead, those skilled in the art will find that the system and methods of the present invention can be advantageously embodied on a variety of different platforms, including MAC OS, ANDROID, UNIX, WINDOWS, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

The computer-implemented techniques of the present invention may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer system, server computer systems, portable computer systems, handheld electronic devices, networking devices or any other computing device that incorporates hard-wired and/or program logic to implement the techniques.

Figure 2:
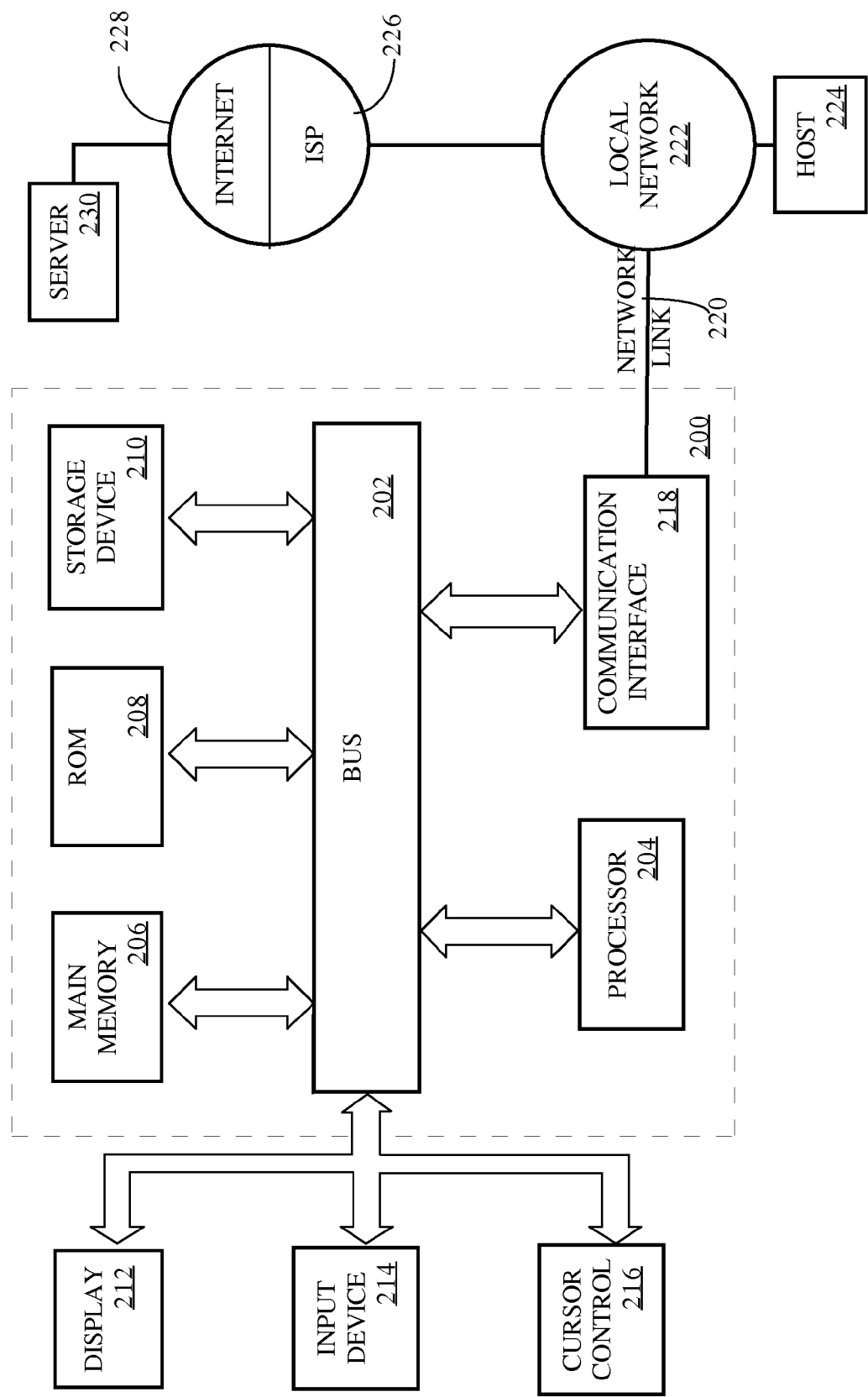
FIG. 2 is a very general block diagram of a computer system which can be used for implementing the present invention.

For example, FIG. 2 is a block diagram that illustrates a computer system 200 upon which an embodiment of the invention can be implemented. Computer system 200 includes a bus 202 or other communication mechanism for communicating information, and a hardware processor 204 coupled with bus 202 for processing information. Hardware processor 204 can be, for example, a general purpose microprocessor. Although only one hardware processor 204 is shown in FIG. 2, computer system 200 can have more than one hardware processor 204 coupled to bus 202 for processing information.

Computer system 200 also includes a main memory 206, such as a random access memory (RAM) or other dynamic storage device, coupled to bus 202 for storing information and instructions to be executed by processor 204. Main memory 206 also can be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 can be coupled via bus 202 to a display 212, such as a liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

A touch-sensitive surface can overlay display 212 as an input device 214 to form a touch-sensitive display that provides an input interface and an output interface between the system 200 and a user. The touch-sensitive surface can be a sensor or set of sensors that accepts input from the user based on haptic and/or tactile contact. Contact with the touch-sensitive surface can be made by the user with a stylus or set of styluses or a finger or a set of fingers. The touch-sensitive surface can detect contact and any movement or breaking thereof using any of a plurality of touch sensing techniques now known or later developed including, but not limited to, capacitive, resistive, infrared, and acoustic wave techniques, as well as other proximity sensor arrays or other elements for detecting one or more points of contact, movement of contact, and breaking of contact with the touch-sensitive surface.

Although display 212, input device 214, and cursor control 216 are illustrated outside the dashed box representing computer system 200 in FIG. 2, it should be understood that one or more of display 212, input device 214, and cursor control 216 can be part of the form factor of the computer system 200. For that matter, although main memory 206, ROM 208, storage device 210, bus 202, processor 204, and communication interface 218 are illustrated inside the dashed box representing computer system 200, it should be understood that one or more of these components can be external to the form factor of the computer system 200 and operatively coupled to the form factor through a peripheral interface.

Computer system 200 can implement the techniques described herein using customized hard-wired logic, one or more ASICs or FPGAs, firmware and/or program logic which, in combination with the computer system, causes or programs computer system 200 to be a special-purpose machine. According to one embodiment, the techniques herein are performed by computer system 200 in response to processor 204 executing one or more sequences of one or more instructions contained in main memory 206. Such instructions can be read into main memory 206 from another storage medium, such as storage device 210. Execution of the sequences of instructions contained in main memory 206 causes processor 204 to perform the process steps described herein. In alternative embodiments, hard-wired circuitry can be used in place of or in combination with software instructions.

The term "storage media" as used herein refers to any non-transitory media that store data and/or instructions that cause a machine to operation in a specific fashion. Such storage media can comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but can be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media can be involved in carrying one or more sequences of one or more instructions to processor 204 for execution. For example, the instructions can initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 can optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 can be an integrated services digital network (ISDN) card, cable modem, satellite modem, or a modem to provide a data communication connection to a corresponding type of telephone line. As another example, communication interface 218 can be a local area network (LAN) card to provide a data communication connection to a compatible LAN. Wireless links can also be implemented. In any such implementation, communication interface 218 sends and receives electrical, electromagnetic or optical signals that carry digital data streams representing various types of information.

Network link 220 typically provides data communication through one or more networks to other data devices. For example, network link 220 can provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code can be executed by processor 204 as it is received, and/or stored in storage device 210, or other non-volatile storage for later execution.

The above-described computer hardware is presented for purposes of illustrating the basic underlying desktop and server computer components that may be employed for implementing the present invention. For purposes of discussion, the following description will present examples of background application control in an APPLE IOS operating system environment. The present invention, however, is not limited to any particular environment or device configuration. In particular, an APPLE IOS operating system environment is not necessary to the invention, but is used to provide a framework for discussion. Instead, the present invention may be implemented in any type of system architecture or processing environment capable of supporting the methodologies of the present invention presented in detail below.

Overview

In accordance with some embodiments of the present invention, a testing system is provided that controls an application executing in a background state by automatically triggering the application to transition from the background state to a foreground state. Here, an "application" may be considered a computer program or set of instructions that provides particular functionality or performs specific tasks. Typically, the application is designed to execute as a process or task on a particular operating system. For example, the application may be designed for an APPLE IOS, ANDROID, UNIX, WINDOWS, MAC OS, or other operating system. By automatically triggering certain application execution state transitions, the present invention is able to provide improved automated testing.

In some operating systems, an application in a background execution state has limited or no ability to foreground itself. In particular, these operating systems do not provide an explicit or dedicated system call interface or other service that the application can invoke to change its execution state from the background state to a foreground state. The APPLE IOS operating system is one example of such an operating system. Generally, an application executing on the APPLE IOS operating system that is in the background state must rely on the operating system to transition it to the foreground state. This behavior is by design to limit computer resource usage and converse battery usage on battery-operated portable computing devices such as, for example, smart phones and tablet computers that have relatively fewer computing resources (e.g., memory) when compared to many desktop and workstation computers that operate on fixed power.

In order to fully automate testing of applications that can be placed into a background state from which the application on its own cannot transition out of, a solution for automating the transition from a background state to a foreground state is needed. In order to automate the transition of an application from a background state to a foreground state, the present invention uses an "interprocess communication facility" provided by an operating system and a "reflector application". For sake of clarity, the application being tested is referred to hereinafter as the "test application" to distinguish it from the reflector application. For sake of brevity, the interprocess communication facility is referred to hereinafter as the "IPC facility".

The IPC facility can be virtually any communication channel between two processes provided by an operating system. The IPC facility used for a particular implementation at hand may vary depending on the particular operating system involved in the implementation. In UNIX operating environments, for example, IPC facility may be a "named pipe". In MICROSOFT WINDOWS environments, for example, the IPC facility may be a "port" which is a similar to a named pipe. In some embodiments in which the operating system is an APPLE IOS operating system, the IPC facility is the "Custom URL Scheme" facility. The Custom URL Scheme facility allows one application to pass a message to another application where the message is in the form of a URL. Specific examples of using the Custom URL Scheme facility to control a background application on an APPLE IOS operating system are provided hereinafter. However, the present invention is not limited to use of only the Custom URL Scheme facility of the APPLE IOS operating system and other IPC facilities may be used according to the requirements of the particular implementation at hand such as UNIX named pipes or MICROSOFT WINDOWS ports.

A desired feature of the IPC facility is that when a sending application sends a message to a receiving application via the IPC facility, the operating system transitions the receiving application to a foreground state if the receiving application is currently in a background state. By doing so, the sending application can cause the receiving application to be automatically brought into a foreground execution state by sending a message to the receiving application via the IPC facility. In the context of the present invention, if the test application is currently in a background state, the reflector application can cause the test application to be automatically brought into a foreground state by sending a message to the test application via the IPC facility.

This feature of the IPC facility can also be used by the test application to automate testing of various different scenarios where the test application transitions from a background state to a foreground state. Such scenarios may correspond to any number of different system events that would cause the test application to transition from a background state to a foreground state under normal or expected operating conditions. The test application may have different "transition handlers" for programmatically handling the different system events or the different scenarios where the test application transitions from a background state to a foreground state. The developer of the test application may wish to test each of the transitions handlers in the context of the test application transitioning from a background state to a foreground state. To do so according to the present invention, the test application sends a message via the IPC facility to the reflector application. The test application can send the message prior to entering a background execution state or after the test application has entered a background execution state. The reflector application, upon receiving the message sent by the test application, sends another message back to the test application via the IPC facility. The operating system transitions the test application from the background state to the foreground so that the test application can handle the message sent by the reflector application. Upon being notified of the message from the reflector application by the operating system, the test application, now in a foreground execution state, invokes a transition handler corresponding to the message sent by the reflector application thereby testing the transitions handler in the context of transitioning from the background state to the foreground state. By using the IPC facility and the reflector application in this way, the test application can programmatically and automatically cause itself to transition from a background state to a foreground state even if the operating system does not provide an explicit or dedicated system call or service to the test application for doing so.

In some embodiments, the message sent via the IPC facility from the test application to the reflector application indicates a particular test to be conducted. The reflector application may contain logic for conducting the particular test. For example, the particular test may involve maintaining the test application in a background execution state for a certain period of time. In this case, the reflector application may pause or suspend its own execution for a period of time before sending a message back to the test application via the IPC facility. In this way, the test application can be maintained in the background state for a period of time until the operating system is ready to notify the test application of the message sent by the reflector application. The reflector application may perform other actions relevant to the particular test at hand. For example, the reflector application may create, alter, or delete a file or other data or otherwise alter the system environment in which the test application is executing.

In some embodiments, the message sent via the IPC facility back to the test application from the reflector application indicates a particular transition handler to be tested. In response to notification of a message sent from the reflector application, the test application invokes the particular transition handler indicated. The particular transition handler indicated may correspond to the particular test indicated by the immediately prior message sent from the test application to the reflector application.

System Components

Figure 3:
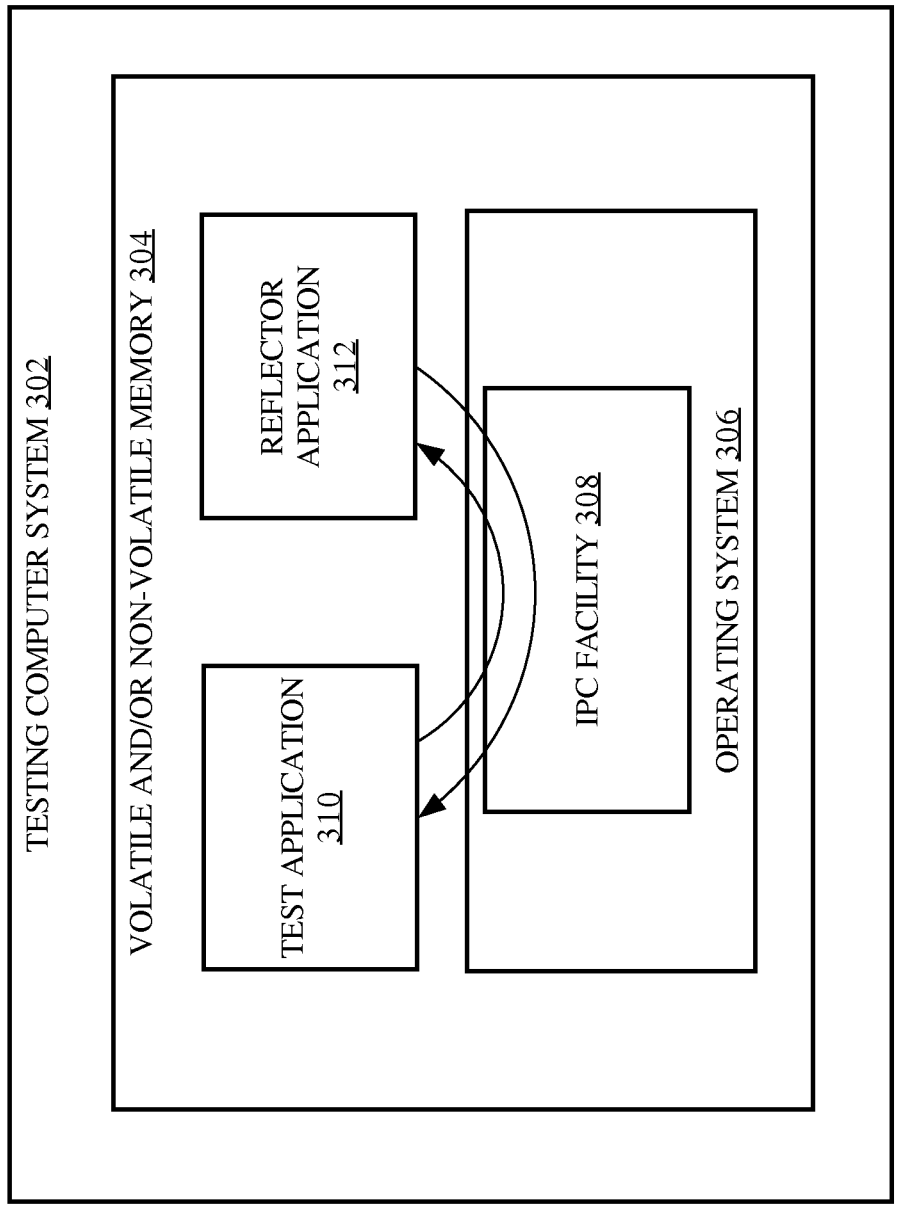
FIG. 3 is a block diagram illustrating a testing system configured to implement background test application control using an IPC facility and a reflector application.

FIG. 3 illustrates an embodiment of a testing system configured to implement background test application control using an IPC facility and a reflector application. Testing system 300 includes testing computer system 302. Testing computer system 302 can be any computing device such as computer system 100 of FIG. 1 capable of supporting the techniques described herein for controlling a background test application using an IPC facility and a reflector application.

Testing computer system 302 includes computer memory 304. Computer memory 304 can include volatile or non-volatile computer memory or a combination of volatile or non-volatile computer memory. Testing computer 302 may include other hardware components (not shown) such as CPU (s) and a hardware bus such as shown in computer system 100 of FIG. 1.

Computer memory 304 includes operating system 306 with IPC facility 308. In some embodiments, operating system 306 is a version of the APPLE IOS operating system and IPC facility is a version of the Custom URL Scheme facility provided by the version of the APPLE IOS operating system. However, it should be understood that the present invention is not limited to APPLE IOS operating system or the Custom URL Scheme IPC facility and other operating systems and other IPC facilities capable of supporting the techniques described herein for background application control may be used.

In some embodiments, testing computer system 302 is a virtualized computer system virtualized in software executing as an application process on a host operating system (not shown). In this case, memory 340 is the virtualized memory of virtual testing computer system 302 and operating system 306 is simulated/emulated by the host operating system. In some embodiments, virtualized testing computer system 302 is a virtual portable computing device such as a smart phone or a tablet computer running the simulated/emulated operating system. In some embodiments, a version of the APPLE XCODE development environment provides the virtualized testing computer system 302.

Also in memory 304 is test application 310 and reflector application 312. In some embodiments, during execution of testing application 310 by operating system 306, prior to test application 310 entering a background execution state, test application 310 sends a message to reflector application 312 via IPC facility 308. Alternatively, test application 310 may send the message to reflector 312 via IPC facility 308 after the test application 310 has entered a background execution state. For example, test application 310 can send the message to reflector application 312 in response to receiving notification from operating system 306 that operating system 306 is about to transition test application 310 to a background execution state or in response to receiving notification from operating system 306 that operating system 306 has transitioned test application 310 to a background execution state. To send the message to reflector application 3121, test application 310 can invoke or call an application programming interface (API) provided by operating system 306 for sending the message to reflector application 312 via IPC facility 308.

The message sent by test application 310 can indicate a test to be conducted by reflector application 306. The test may correspond to a particular test application 301 usage scenario where the test application 310 performs some tasks or function in the context of transitioning from a background execution state to a foreground execution state. For example, a possible test might be to verify that test application 310 prompts for an application access passcode or pin code after being in a background execution state for longer than a certain amount of time.

Reflector application 312 receives the message sent by test application 310 via IPC facility 308. At this point, test application 310 is in or about to be in a background execution state. As mentioned, in a background execution state, operating system 306 may limit test application 310, relative to when a foreground execution state, as to the tasks and functions that test application 310 can perform while in the background execution state. For example, operating system 306 may not notify test application 310 of certain user interface events when test application 310 is in the background execution state and may not allow or may allow only limited interaction with the video display.

In response to receiving the message sent by test application 310, reflector application 312 sends another message back to test application 310 via IPC facility 308. This message sent by reflector application 312 may "reflect" the message it received from test application 310. In particular, the message sent from reflector application 312 may indicate the test to be conducted indicated by the received message sent by test application 310. For sake of clarity, a message sent by test application 310 to reflector application 312 via IPC facility 308 that indicates a test to be conducted is referred to hereinafter as a "test message". A message sent by reflector application 312 back to test application 310 in response to receiving a test message is referred to hereinafter as a "reflected message" that corresponds to the test message. As mentioned, the reflected message corresponding to a test message can indicate the test to be conducted indicated in the test message.

In response to reflector application sending the reflected message, operating system 306 transitions test application from the background execution state to a foreground execution state. This may be done so that test application 310 can respond to the reflected message while in a foreground execution state. In the foreground execution state, test application 310 performs tasks or functions indicated by the reflected message. For example, test application 310 may invoke one of its sub-routines or functions corresponding to the test indicated by the reflected message. In this way, particular test application 310 functionality is automatically tested in the context of transitioning from a background execution state to a foreground execution state.

Test application 310 and reflector application 312 can repeat the cycle of sending a test message followed by a reflected message to automatically test various test application 310 functionality in the context of transitioning from a background execution state to a foreground execution state.

Method of Operation

Figure 4:
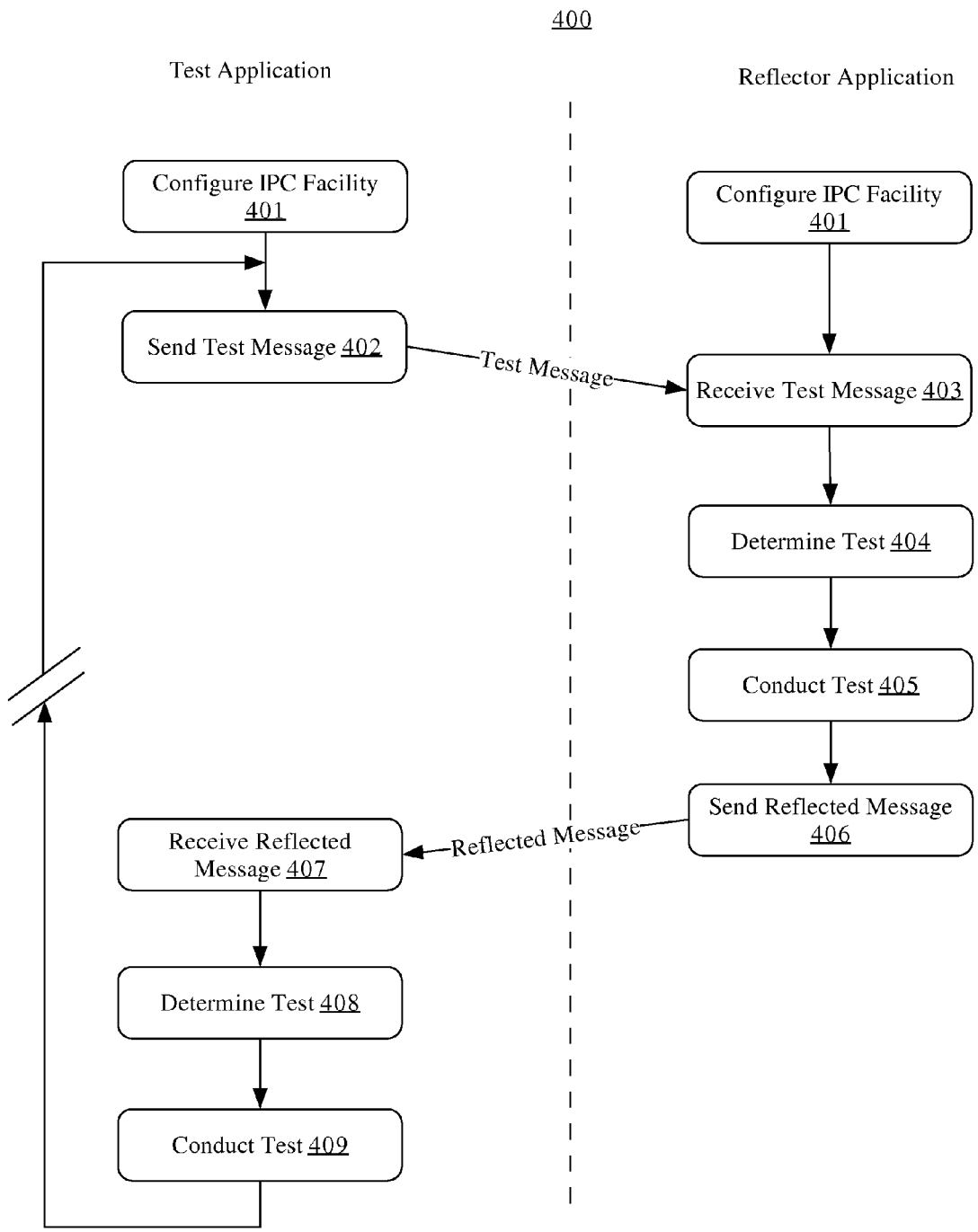
FIG. 4 presents a flowchart illustrating a high-level method of operation of the testing system of the present invention in controlling a background application.

FIG. 4 comprises a flowchart 400 illustrating a high-level method of operation of the testing system of the present invention in controlling a background test application. The following description presents method steps that may be implemented using computer-executable instructions, for directing operation of a computing device under processor control. The computer-executable instructions may be stored on a computer-readable medium, such as CD, DVD, flash memory, or the like. The computer-executable instructions may also be stored as a set of downloadable computer-executable instructions, for example, for downloading and installation from a network location. The following discussion uses the operations of the system of the present invention in an APPLE IOS operating environment as an example, however a similar approach may also be used in other operating environments.

As described above, a test application and a reflector application may execute on an operating system that provides an IPC facility. For example, the IPC facility may be the Custom URL Scheme provided by the APPLE IOS operating system, however other IPC facilities may be used in other operating systems. As shown at FIG. 4, the method begins at step 401 with the test application configuring the IPC facility to notify it when messages are sent to it via the IPC facility. Also at step 401, before, after, or concurrently with test application configuring the IPC facility, a reflector application similarly configures the IPC facility to notify it when messages are sent to it via the IPC facility.

For example, if the IPC facility is the Custom URL Scheme provided by the APPLE IOS operating system, then the test application can register with the Custom URL Scheme to be notified when a URL message is sent that begins with the URL prefix "mytestapp://". Here, the string "mytestapp" is used by the Custom URL Scheme to identify URL messages sent by applications destined for the test application. However, the string "mytestapp" is merely one example of a possible identifier and any string identifier that the Custom URL Scheme can use to identify URL messages destined for the test application may be used by the test application when registering with the Custom URL Scheme. Similarly, the reflector application can register with the Custom URL Scheme to be notified when a URL message is sent that begins with the URL prefix "myreflectorapp://". Again, the string "myreflectorapp" is merely one example of a possible identifier and any string identifier that the Custom URL Scheme can use to identify URL messages destined for the reflector application may be used by the reflector application when registering with the Custom URL Scheme.

At step 402, after the reflector application has configured the IPC facility to notify it of messages sent to it, the test application sends a test message to the reflector application via the IPC facility. The test message may be sent to the reflector application when the test application is in a background execution state or is about to transition into a background execution state. The test message may indicate a test to be conducted by the reflector application.

For example, if the IPC facility is the Custom URL Scheme provided by the APPLE IOS operating system, the test message might be the URL "myreflectorapp://importFile". In this example, the prefix "myreflectorapp://" signals the Custom URL Scheme that the message is to be sent to the reflector application. The sub-string "importFile" indicates the test to be conducted by the reflector application. In this example, an import file test.

At step 403, the reflector application receives the test message sent by the test application in step 402. For example, if the IPC facility is the Custom URL Scheme provided by the APPLE IOS operating system, the received test message might be the URL "myreflectorapp://importFile".

At step 404, the reflector application determines the test to be conducted based on the test message received at step 403. In particular, the test message may indicate the name of the test to be conducted. From the name of the test, the reflector application can determine what the appropriate or corresponding task or function to perform is. For example, if the IPC facility is the Custom URL Scheme provided by the APPLE IOS operating system, the reflector application may parse the test message to determine the server name portion of the URL message. For example, the server name portion of the URL message "myreflectorapp://importFile" is "importFile". The server name portion of the URL message can be used to indicate the test name. In this example, the test name is "importFile". From the test name, the reflector application can determine what task or function to perform. For example, from the test name "importFile" the reflector application can determine which sub-routine or function of the reflector application to call or invoke. In this way, the reflector application can dispatch the test message to the test to be conducted requested in the test message. Other portions of the test message may be used to indicate other test information. For example, if the IPC facility is the Custom URL Scheme provided by the APPLE IOS operating system, the query string portion of the URL test message can be used to specify test parameters of the test to be conducted specified by the server name portion of the URL test message.

At step 405, the reflector application conducts the test. The functions or tasks performed may vary depending of the particular test to be conducted. For some tests, no functions or tasks are performed. In general, however, at step 405, the reflector application performs any tasks or functions pertaining to the test that are to be performed or initiated before the test application is transitioned out of the background execution state.

At step 406, after the test application has configured the IPC facility to notify it of messages sent to it via the IPC facility, the reflector application sends a reflected message to the test application via the IPC facility. The reflected message may be sent to the test application when the test application is in a background execution state. The reflector application sends the reflected message is such a way so as to cause the operating system to transition the test application from the background execution state to a foreground execution state. For example, if the IPC facility is the Custom URL Scheme provided by the APPLE IOS operating system, then sending a URL message via the Custom URL Scheme that the test application has registered to receive will cause the operating system to transition the test application out of a background execution state into a foreground execution state if the test application is in a background execution state at the time the URL message is sent. For example, if the test application has registered with the Custom URL Scheme to receive URL messages that begin with "mytestapp://", then sending a URL message with that prefix will cause the operating system to transition the test application out of a background execution state into a foreground execution state if the test application is in a background execution state at the time the URL message is sent.

At step 407, the test application receives the reflected message sent by the reflector application in step 406. For example, if the IPC facility is the Custom URL Scheme provided by the APPLE IOS operating system, the received reflected message might be the URL "mytestapp://importFile". Note that while in this example the server name portion of the reflected URL message is the same as the server name portion of the test URL message, namely "importFile", it need not be the same. The test application may receive the reflected message while in a foreground execution state. For example, the operating system may transition the test application from a background execution state to a foreground execution state and then provide the reflected message to the test application via an Application Programming Interface (API). Other methods of providing the reflected message to the test application are possible and the present invention is not limited to any particular method.

At step 408, the test application determines the test to be conducted based on the reflected message received at step 407. In particular, the reflected message may indicate the name of the test to be conducted. From the name of the test, the test application can determine what the appropriate or corresponding task or function to perform is. For example, if the IPC facility is the Custom URL Scheme provided by the APPLE IOS operating system, the test application may parse the test message to determine the server name portion of the URL message. For example, the server name portion of the URL message "mytestapp://importFile" is "importFile". The server name portion of the URL message can be used to indicate the test name. In this example, the test name is "importFile". From the test name, the test application can determine what task or function to perform. For example, from the test name "importFile" the test application can determine which sub-routine or function of the test application to call or invoke. In this way, the test application can dispatch the reflected message to the test to be conducted reflected in the reflected message. Other portions of the reflected message may be used to indicate other test information. For example, if the IPC facility is the Custom URL Scheme provided by the APPLE IOS operating system, the query string portion of the reflected URL message can be used to specify test parameters of the test to be conducted specified by the server name portion of the reflected URL message.

At step 409, the test application conducts the test. The functions or tasks performed may vary depending of the particular test to be conducted. In general, however, at step 409, the test application invokes the functions or tasks to be tested in the context of transitioning from a background execution state to a foreground execution state.

Steps 402-409 may be repeated for additional tests to be conducted.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computing device comprising:
   memory;
   one or more processors operatively coupled to the memory;
   a test application stored in the memory and executable by the one or more processors; and
   a reflector application stored in the memory and executable by the one or more processors;
   wherein the test application is configured to send a test message to the reflector application, the test message indicating that a test of the test application is to be conducted while the test application is in a foreground execution state;
   wherein receipt of the test message by the reflector application causes the reflector application to respond to the test message from the test application by sending a reflected message, to the test application, that causes:
   (a) the test application to transition from a background execution state to the foreground execution state, and
   (b) the test of the test application to be conducted after the test application has transitioned from the background execution state to the foreground execution state;
   wherein the test application is configured to send the test message after entering the background execution state;
   wherein the test message indicates that the test to be conducted is to be conducted at least in part by the reflector application;
   wherein the reflector application is further configured to perform at least part of the test to be conducted in response to receiving the test message;
   wherein at least part of the test to be conducted comprises the test application being in the background execution state for at least a specified period of time; and
   wherein the reflector application is further configured to wait for at least the specified period of time before sending the reflected message in response to receiving the test message.

2. The device of claim 1, wherein the test message and the reflected message are both in the form of a Uniform Resource Locator (URL).

3. The device of claim 1, wherein the reflected message indicates that the test to be conducted is to be conducted at least in part by the test application; and wherein the test application is further configured to perform at least part of the test to be conducted in response to receiving the reflected message.

4. The device of claim 3, wherein the test application is further configured to perform at least part of the test to be conducted in the foreground execution state.

5. The device of claim 3, wherein at least part of the test to be conducted comprises importing a file; and wherein the test application is further configured to import a file in response to receiving the reflected message.

6. The device of claim 1, wherein the test application is designed to execute on a mobile operating system.

7. The device of claim 1, wherein the test message and the reflected message are sent via an interprocess communication facility provided by an operating system executing the test application and the reflector application.

8. A method comprising:
prior to a first application entering a background execution state, the first application sending a test message to a second application, the test message indicating that a test of the first application to be conducted while the first application is in a foreground execution state;
wherein after sending the test message, the first application enters the background execution state;
wherein receipt of the test message by the second application causes the second application to respond to the test message from the first application by sending a reflected message, to the first application;
wherein sending the reflected message causes:
 (a) the first application to transition from the background execution state to the foreground execution state, and
 (b) the test of the first application to be conducted after the first application has transitioned from the background execution state to the foreground execution state;
wherein the test message indicates that the test to be conducted is to be conducted at least in part by the second application;
wherein the method further comprises the second application performing at least part of the test to be conducted in response to receiving the test message;
wherein at least part of the test to be conducted comprises the first application being in the background execution state for at least a specified period of time;
wherein the method further comprises the second application waiting for at least the specified period of time before sending the reflected message in response to receiving the test message; and
wherein the method is performed by a computing device.

9. The method of claim 8, wherein the test message and the reflected message are both in the form of a Uniform Resource Locator (URL).

10. The method of claim 8, wherein the reflected message indicates that the test to be conducted is to be conducted at least in part by the first application; and wherein the method further comprises:
after the first application has transitioned from the background execution state to the foreground execution state, the first application performing at least part of the test to be conducted in response to receiving the reflected message.

11. The method of claim 8, wherein the first application is designed to execute on a mobile operating system.

12. The method of claim 8, wherein the test message and the reflected message are sent via an interprocess communication facility provided by an operating system executing the first application and the second application.

13. A method comprising:
after a first application enters a background execution state, the first application sending a test message to a second application, the test message indicating that a test of the first application to be conducted while the first application is in a foreground execution state;
wherein receipt of the test message by the second application causes the second application to respond to the test message from the first application by sending a reflected message, to the first application;
wherein sending the reflected message causes:
 (a) the first application to transition from the background execution state to the foreground execution state, and
 (b) the test of the first application to be conducted after the first application has transitioned from the background execution state to the foreground execution state;
wherein the test message indicates that the test to be conducted is to be conducted at least in part by the second application;
wherein the method further comprises the second application performing at least part of the test to be conducted in response to receiving the test message;
wherein at least part of the test to be conducted comprises the first application being in the background execution state for at least a specified period of time;
wherein the method further comprises the second application waiting for at least the specified period of time before sending the reflected message in response to receiving the test message; and
wherein the method is performed by a computing device.

14. The method of claim 13, wherein the test message and the reflected message are both in the form of a Uniform Resource Locator (URL).

15. The method of claim 13, wherein the reflected message indicates that the test to be conducted is to be conducted at least in part by the first application; and wherein the method further comprises:
after the first application has transitioned from the background execution state to the foreground execution state, the first application performing at least part of the test to be conducted in response to receiving the reflected message.

16. The method of claim 13, wherein the first application is designed to execute on a mobile operating system.

* * * * *